US012473512B2

(12) United States Patent
Caggioni et al.

(10) Patent No.: US 12,473,512 B2
(45) Date of Patent: Nov. 18, 2025

(54) STRUCTURING PREMIXES AND LIQUID COMPOSITIONS COMPRISING THEM

(71) Applicant: The Procter & Gamble Company, Cincinnati, OH (US)

(72) Inventors: Marco Caggioni, Cincinnati, OH (US); Vincenzo Guida, Sint-Pieters-Woluwe (IT); Jocelyn Michelle McCullough, Loveland, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 57 days.

(21) Appl. No.: 17/731,625

(22) Filed: Apr. 28, 2022

(65) Prior Publication Data

US 2022/0364023 A1 Nov. 17, 2022

(30) Foreign Application Priority Data

Apr. 29, 2021 (EP) .................................... 21171083
Jan. 25, 2022 (EP) .................................... 22153177

(51) Int. Cl.

| | |
|---|---|
| ***C11D 1/831*** | (2006.01) |
| ***C11D 3/00*** | (2006.01) |
| ***C11D 3/37*** | (2006.01) |
| ***C11D 3/382*** | (2006.01) |
| ***C11D 11/00*** | (2006.01) |
| ***C11D 17/00*** | (2006.01) |
| *C11D 1/14* | (2006.01) |
| *C11D 1/22* | (2006.01) |
| *C11D 1/29* | (2006.01) |
| *C11D 1/66* | (2006.01) |
| *C11D 1/72* | (2006.01) |
| *C11D 1/75* | (2006.01) |

(52) U.S. Cl.

CPC ............ *C11D 1/831* (2013.01); *C11D 3/0015* (2013.01); *C11D 3/3796* (2013.01); *C11D 3/382* (2013.01); *C11D 17/0013* (2013.01); *C11D 1/143* (2013.01); *C11D 1/22* (2013.01); *C11D 1/29* (2013.01); *C11D 1/667* (2013.01); *C11D 1/72* (2013.01); *C11D 1/75* (2013.01); *C11D 2111/12* (2024.01)

(58) Field of Classification Search

CPC ....... C11D 1/831; C11D 3/382; C11D 3/3796; C11D 17/0013; C11D 17/0017

See application file for complete search history.

(56) References Cited

U.S. PATENT DOCUMENTS

2004/0058845 A1* 3/2004 Metrot ..................... C11D 1/86 510/466
2006/0189507 A1* 8/2006 Metrot ................. C11D 3/0015 510/515
2006/0205631 A1 9/2006 Smerznak et al.
2011/0065625 A1* 3/2011 Boutique ........... C11D 17/0026 510/513
2014/0349908 A1* 11/2014 Delaney ................. C11D 1/825 510/337
2014/0349914 A1* 11/2014 Holder ................. C11D 3/2086 510/488
2016/0024432 A1* 1/2016 Sivik ...................... C11D 3/001 510/521
2016/0060573 A1* 3/2016 Fossum .................. C11D 3/373 510/327
2016/0060575 A1* 3/2016 Panandiker ............ C11D 3/373 510/327
2017/0211019 A1* 7/2017 Sivik .................... C11D 3/3749
2018/0320108 A1* 11/2018 Boutique ................. C11D 1/83
2018/0320109 A1* 11/2018 Boutique ............... C11D 1/831
2019/0241841 A1* 8/2019 Tchakalova ............ A61K 8/361
2021/0277327 A1* 9/2021 Panandiker .......... C11D 7/3209
2021/0380904 A1* 12/2021 Vaes ........................ C11D 3/30
2022/0177813 A1* 6/2022 Natoli ................ C11D 17/0021
2022/0364023 A1* 11/2022 Caggioni ............ C11D 3/3796

FOREIGN PATENT DOCUMENTS

CN 1678722 A 10/2005
CN 1681911 A 10/2005
CN 104837978 A 8/2015
EP 1396535 A1 * 3/2004 ............... C11D 1/83
EP 1396536 A1 3/2004
JP 2009057515 A 3/2009
JP 2016113510 A 6/2016
JP 2016520698 A 7/2016
JP 2020100737 A 7/2020
WO 1995002667 A1 1/1995
WO 03091374 A1 11/2003

(Continued)

OTHER PUBLICATIONS

Lankem ; The HLB Concept. https://www.lankem.com/post/the-hlb-concept (Year: 2019).*
Extended European Search Report and Search Opinion; Application No. 21171083.5; dated Oct. 13, 2021; 08 pages.
Extended European Search Report and Search Opinion; Application No. 22153177.5; dated Jun. 14, 2022; 06 pages.
PCT Search Report and Written Opinion for PCT/US2022/025484 dated Jun. 21, 2022, 13 pages.

*Primary Examiner* — Mark Eashoo
*Assistant Examiner* — M. Reza Asdjodi
(74) *Attorney, Agent, or Firm* — Carolyn S. Powell; Andrew J. Mueller; George H. Leal

(57) ABSTRACT

A structuring premix having a non-polymeric, crystalline, hydroxyl-containing structuring agent and at least two non-ionic surfactants having a low HLB and a high HLB. A liquid fabric care composition that includes such a structuring premix. A process for making a structured liquid fabric care composition.

17 Claims, No Drawings

(56) References Cited

FOREIGN PATENT DOCUMENTS

| | | | | |
|---|---|---|---|---|
| WO | 2004022681 A1 | | 3/2004 | |
| WO | WO-2018073238 A1 | * | 4/2018 | ............. A61K 8/042 |

* cited by examiner

STRUCTURING PREMIXES AND LIQUID COMPOSITIONS COMPRISING THEM

FIELD OF THE INVENTION

The present disclosure relates to structuring premixes that include non-polymeric, crystalline, hydroxyl-containing structuring agents and at least two nonionic surfactants. The present disclosure also relates to related fabric care compositions and processes of making them.

BACKGROUND OF THE INVENTION

As liquid fabric care compositions become more complex, they become harder to structure. It is desirable to structure such compositions, both in order to suspend actives such as encapsulated perfumes, but also to connote a richness in the formula.

Fabric softening compositions typically comprise vesicles of cationically charged surfactants. In addition, there is a desire to formulate laundry detergent compositions which comprise little or no anionic surfactant. Such detergent compositions can be so formulated in order to better incorporate cationic ingredients such as cationically charged polymers and/or cationic antibacterial agents. Anionic surfactants can complex with such cationic actives, leading to reduced efficacy and also poor phase stability.

There is also a desire to structure laundry detergent compositions, especially with little or no anionic surfactant, for both skin care reasons and also to provide specific cleaning benefits. liquid laundry compositions comprising little or no anionic surfactant have typically been structured using polymeric uncharged or cationically charged structurants, since anionically charged structurants and structurant premixes which comprise anionic surfactant can complex with cationic actives, or are not as effective at forming a structure throughout a liquid composition which comprises only low levels of anionic surfactant.

It remains challenging for structure such compositions without leading to poor phase stability. Moreover, polymeric structurants are generally challenging to formulate with, as they can give rise to depletion flocculation when used to structure colloidal systems. Depletion flocculation can be eliminated or at least minimised through the use of cross-linked nonionic or cationic polymeric structurants such as Rheovis™ CDE, Rheovis™ CDX, or FloSoft™ 222. However, the efficacy of such polymeric structurants remains highly dependent on the concentration of salts present. Hence, the viscosity and structuring efficacy can change as levels of salt introduced with other ingredients changes.

Structuring premixes comprising non-polymeric, crystalline, hydroxyl-containing structuring agents are known for suspending actives in detergent compositions. However, such premixes typically have used anionic surfactant to emulsify the non-polymeric, crystalline, hydroxyl-containing structuring agent. As such, they remain unsuitable for structuring liquid compositions which comprise little or no anionic surfactant, or comprise cationically-charged or cationically-coated ingredients.

In addition, since a variety of compositions are typically made on the same site, there is a desire to provide structuring premixes which are compatible across multitudes of different compositions.

Hence, a need remains for a structuring premix which is more salt-tolerant and can be used to structure different laundry liquid compositions, in particular which comprise little or no anionic surfactant, while avoiding problems with poor phase stability which is associated with cationically charged or uncharged polymeric structuring agents.

Structuring systems are known, specifically thread-like structuring systems and/or disk-like structuring systems wherein structuring agents aggregate together to form disk-like structures that can interact with other disk-like structures to result in a structuring system, and processes for making such structuring systems, stabilized liquid compositions comprising such structuring systems, systems that utilize such structuring systems for stabilizing liquid compositions, and methods for utilizing the stabilized liquid compositions to provide a benefit. Methods are known of compatibilizing an anionic polymeric rheology modifier with cationic ingredients, which comprises complexing a cationic ingredient with an anionic complexing agent before combining the complexed cationic ingredient with an anionic rheology modifier. Compositions are known that comprise an anionic polymeric rheology modifier and a complexed cationic ingredient and a personal care or a household composition containing an anionic rheology modifier and a cationic ingredient complexed with an anionic complexing agent. Compositions that include cationic micelles with anionic polymeric counterions care known, as are related methods and systems thereof. Liquid textile or hard surface treatment agent are known that comprise: at least one nonionic, amphiphilic associative thickener and a cationic biocidal compound. Structuring systems are known that comprise crystallizable glyceride(s) emulsified with an alkanolamine-neutralized anionic surfactant, for use in liquid or gel-form detergents.

SUMMARY OF THE INVENTION

The present disclosure relates to a structuring premix that includes: from 1.0% to 16% by weight of a non-polymeric, crystalline, hydroxyl-containing structuring agent; and from 4.0% to 20% of at least two nonionic surfactants, wherein the at least two nonionic surfactants are selected from: at least one low HLB nonionic surfactant, wherein the at least one low HLB nonionic surfactant has an HLB of from 5.0 to 9.5; at least one high HLB nonionic surfactant, wherein the at least one high HLB nonionic surfactant has an HLB of from 10.5 to 16.0; wherein the average HLB of the at least two nonionic surfactants is from 9.5 to 12.5.

The present disclosure further relates to a liquid detergent composition that includes a structuring premix, where the liquid detergent composition includes less than 7.5% of anionic surfactant.

DETAILED DESCRIPTION OF THE INVENTION

The structuring premixes of the present disclosure provide good structuring for a variety of liquid compositions, especially liquid compositions comprising little or no anionic and/or comprising cationic ingredients. In addition, the structuring premixes provide a rheology which is more salt-tolerant and more phase stable than that provided by polymeric structurants.

As defined herein, "essentially free of" a component means that the component is present at a level of less that 15%, preferably less 10%, more preferably less than 5%, even more preferably less than 2% by weight of the respective premix or composition. Most preferably, "essentially free of" a component means that no amount of that component is present in the respective premix, or composition.

As defined herein, "stable" means that no visible phase separation is observed for a premix kept at 25° C. for a period of at least two weeks, preferably at least four weeks, more preferably at least a month or even more preferably at least four months, as measured using the Floc Formation Test, described in USPA 2008/0263780 A1.

All percentages, ratios and proportions used herein are by weight percent of the respective premix or composition, unless otherwise specified. All average values are calculated "by weight" of the respective premix, composition, or components thereof, unless otherwise expressly indicated.

Unless otherwise noted, all component, premix, or composition levels are in reference to the active portion of that component, premix, or composition, and are exclusive of impurities, for example, residual solvents or by-products, which may be present in commercially available sources of such components or compositions.

All measurements are performed at 25° C. unless otherwise specified.

The Structuring Premix

The non-polymeric crystalline, hydroxyl functional structuring agent is emulsified using surfactant, to form the structuring premix. Non-polymeric crystalline, hydroxyl functional structuring agents can comprise a crystallisable glyceride. Preferably, the non-polymeric, crystalline, hydroxyl-containing structuring agent comprises, or even consists of, hydrogenated castor oil (commonly abbreviated to "HCO") or derivatives thereof.

Castor oil is a triglyceride vegetable oil, comprising predominately ricinoleic acid, but also oleic acid and linoleic acids. When hydrogenated, it becomes castor wax, otherwise known as hydrogenated castor oil. The hydrogenated castor oil may comprise at least 85% by weight of the castor oil of ricinoleic acid. Preferably, the hydrogenated castor oil comprises glyceryl tris-12-hydroxystearate (CAS 139-44-6). In a preferred embodiment, the hydrogenated castor oil comprises at least 85%, more preferably at least 95% by weight of the hydrogenated castor oil of glyceryl tris-12-hydroxystearate. However, the hydrogenated castor oil composition can also comprise other saturated, or unsaturated linear or branched esters. In a preferred embodiment, the hydrogenated castor oil has a melting point in the range of from 45° C. to 95° C., as measured using ASTM D3418 or ISO 11357. The hydrogenated castor oil may have a low residual unsaturation and will generally not be ethoxylated, as ethoxylation tends to reduce the melting point temperature to an undesirable extent. By low residual unsaturation, we herein mean an iodine value of 20 of less, preferably 10 or less, more preferably 3 or less. Those skilled in the art would know how to measure the iodine value using commonly known techniques.

The structuring premix comprises from 1.0% to 16%, preferably from 1.0% to 10%, more preferably from 2.0% to 6.0 by weight of the non-polymeric, crystalline, hydroxyl-containing structuring agent.

The structuring premix of the present disclosure preferably comprises water. Water is preferably present at a level of from 45% to 97%, more preferably from 55% to 93%, even more preferably from 65% to 87% by weight of the structuring premix.

The structuring premix of the present disclosure comprises at least two nonionic surfactants, wherein the at least two nonionic surfactants are selected from:

a) at least one low HLB nonionic surfactant, wherein the at least one low HLB nonionic surfactant has an HLB of from 5 to 9.5, preferably from 7.5 to 9.0;

b) at least one high HLB nonionic surfactant, wherein the at least one high HLB nonionic surfactant has an HLB of from 10.5 to 16, preferably from 12 to 14.5;

wherein the average HLB of the at least two nonionic surfactants is from 9.5 to 12.5, preferably from 11.0 to 12.0.

Where the premix comprises more than one low HLB nonionic surfactant, the low HLB nonionic surfactant has an average HLB within the aforementioned range. Where the premix comprises more than one high HLB nonionic surfactant, the high HLB nonionic surfactant has an average HLB within the aforementioned range.

It has been found that the combination of low HLB nonionic surfactant and high HLB nonionic surfactant results in improved structuring, over premixes which comprise one nonionic surfactant.

The "HLB" is the hydrophilic-lipophilic balance of a surfactant. This is a measure of the degree to which it is hydrophilic or lipophilic, determined by calculating values for the different regions of the molecule. While other methods of calculating the HLB are known (notably the Davis method, Davies JT (1957), "*A quantitative kinetic theory of emulsion type, I. Physical chemistry of the emulsifying agent*"), for the purposes of this invention, the Griffen method, as described in riffin, W C. (1949), "Classification of Surface-Active Agents by 'HLB'" and Griffin, W C. (1954), "*Calculation of HLB Values of Non-Ionic Surfactants*", is used:

Griffin's method for calculating the HLB of non-ionic surfactants, as described in 1954, is as follows:

$$HLB=20*M_h/M$$

Wherein: $M_h$ is the molecular mass of the hydrophilic portion of the molecule, and M is the molecular mass of the whole molecule, giving a result on a scale of from 0 to 20.

The average HLB of a combination of nonionic surfactants is the weight average of the HLBs of the individual surfactants:

$$\text{Weight average HLB}=(x_1*HLB_1+x_2*HLB_2+\ldots)/(x_1+x_2+\ldots)$$

wherein $x_1, x_2, \ldots$ are the weights in grams of each nonionic surfactant of the mixture and $HLB_1, HLB_2, \ldots$ are the HLB of each nonionic surfactant.

The structuring premix comprises from 4.0% to 20%, preferably from 10% to 16% by weight of the nonionic surfactant. The structuring premix can comprise: from 0.5% to 8.0%, preferably from 1.0% to 7.0%, more preferably from 2.0% to 6.0% by weight of the low HLB nonionic surfactant; and from 1.5% to 16%, preferably from 4.0% to 11.0%, more preferably from 6.0% to 8.0% by weight of the high HLB nonionic surfactant.

Suitable nonionic surfactants for either or both the low HLB nonionic surfactant and high HLB nonionic surfactant include alkoxylated alcohol nonionic surfactants, alkyl polyglucoside nonionic surfactants, and mixtures thereof. Preferably, the low HLB nonionic surfactant and high HLB nonionic surfactant are the same class of nonionic surfactant.

Suitable alkoxylated alcohol non-ionic surfactants can be linear or branched, primary or secondary alkyl alkoxylated non-ionic surfactant. Alkyl ethoxylated non-ionic surfactants are preferred.

Alkoxylated alcohol non-ionic surfactants which are suitable for use as low HLB nonionic surfactants can have an alkyl chain length which comprises from 8 to 18 carbon atoms, or from 10 to 16 carbon atoms, or from 12 to 14 carbon atoms. Alkoxylated alcohol non-ionic surfactants which are suitable for use as low HLB nonionic surfactants are preferably ethoxylated and more preferably do not have any other kind of alkoxylation. Suitable low HLB nonionic surfactants can have an average degree of alkoxylation of from 0 to 6.0, preferably from 0.5 to 4.5, more preferably from 2.5 to 3.5.

Suitable alkoxylated alcohol non-ionic surfactants which are suitable for use as low HLB nonionic surfactants include: Tomadol® 1-3 (C11 EO3, supplied by Evonik Industries), Surfonic® 24-3 (C12-14 EO3, supplied by Huntsman), and Tomadol® 25-3 (C12-15 EO3, supplied by Evonik Industries.

Alkoxylated alcohol non-ionic surfactants which are suitable for use as high HLB nonionic surfactants can have an alkyl chain length which comprises from 8 to 24 carbon atoms, or from 8 to 18 carbon atoms, or from 9 to 16 carbon atoms. Alkoxylated alcohol non-ionic surfactants which are suitable for use as high HLB nonionic surfactants are preferably ethoxylated and more preferably do not have any other kind of alkoxylation. Suitable for use as high HLB nonionic surfactants can have an average degree of alkoxylation of from 6.5 to 16.0, preferably from 7.0 to 14.0 carbon atoms in its alkyl chain and on average from 8.0 to 12.

Suitable alkoxylated alcohol non-ionic surfactants which are suitable for use as high HLB nonionic surfactants include: Tomadol 25-12 (C12-15 EO12, supplied by Evonik Industries), Tomadol 91-8 (C9-11 EO8, supplied by Evonik Industries), Surfonic 24-9 (C12-14 EO9, supplied by Huntsman), Lorodac 26-7 (C12-16 EO7, supplied by Sasol).

The premix can comprise less than 5.0%, preferably less than 2.0% more preferably from 0.25% to 1.0% by weight of anionic surfactant. If present, the anionic surfactant can be selected from the group consisting of alkyl sulphate surfactant, alkyl alkoxy sulphate surfactant, linear alkyl benzene sulphonate surfactant, and mixtures thereof, preferably linear alkyl benzene sulphonate surfactant.

Suitable alkyl sulphate surfactants can have a mol average alkyl chain length of the alkyl sulphate anionic surfactant can be from 8 to 18. Suitable alkyl alkoxy sulphate surfactants are preferably ethoxylated alkyl sulphate surfactants. The alkyl alkoxy sulphate surfactants can have a mol average alkyl chain length of the alkyl sulphate anionic surfactant can be from 8 to 18. Suitable alkyl benzene sulphonates include C10-C18 alkyl benzene sulphonates.

The structuring premix may contain additional surfactant in addition to the nonionic surfactant and anionic surfactant (if present). In particular, the structuring premix may comprise additional surfactant selected from: cationic surfactant; amphoteric surfactant; zwitterionic surfactant; and mixtures thereof. However, the premix preferablky comprises no additional surfactant beyond the nonionic surfactant and anionic surfactant (if present).

The structuring premix may further comprise a pH adjusting agent, especially if a non-neutralised anionic surfactant is used to form the premix. Any known pH-adjusting agents can be used, including alkalinity sources as well as acidifying agents of either inorganic type and organic type, depending on the desired pH.

If needed, the pH-adjusting agent can be present at concentrations from 0.001% to 3.0%, preferably from 0.005% to 1.0%, more preferably from 0.01% to 0.5% by weight of the structuring premix.

Preferred inorganic alkalinity sources are sodium hydroxide, and potassium hydroxide and mixtures thereof, most preferably inorganic alkalinity source is sodium hydroxide. Although not preferred for ecological reasons, water-soluble phosphate salts may be utilized as alkalinity sources, including pyrophosphates, orthophosphates, polyphosphates, phosphonates, and mixtures thereof.

Suitable alkanolamines may be selected from the lower alkanol mono-, di-, and trialkanolamines, such as monoethanolamine; diethanolamine or triethanolamine Higher alkanolamines have higher molecular weight and may be less mass efficient for the present purposes. Mono- and di-alkanolamines are preferred for mass efficiency reasons. Monoethanolamine is particularly preferred, however an additional alkanolamine, such as triethanolamine, can be useful in certain embodiments as a buffer. Most preferred alkanolamine used herein is monoethanol amine.

The structuring premix preferably has a pH in the range of from 5 to 11, or from 6 to 9.5, or from 7 to 9, optionally by using a buffer. Without wishing to be bound by theory, it is believed that the buffer stabilizes the pH of the structuring premix, thereby limiting any potential hydrolysis of the HCO structurant. However, buffer-free embodiments can be contemplated and when HCO hydrolyses, some 12-hydroxystearate may be formed, which is also capable of structuring, though to a lesser extent than HCO. In certain preferred buffer-containing embodiments, the pH buffer does not introduce monovalent inorganic cations, such as sodium, into the structuring premix. The preferred buffer is a monethanolamine salt, such as the salt of boric acid. However embodiments are also contemplated in which the buffer is free from any deliberately added sodium, boron or phosphorus. In some embodiments, the monoethanol amine salt may be present at a level of from 0% to 5%, from 0.5% to 3%, or from 0.75% to 1% by weight of the structuring premix.

Alkanolamines such as triethanolamine and/or other amines can be used as part of a buffer system, provided that alkanolamine is first added in an amount sufficient for the primary structurant emulsifying purpose of neutralizing the acid form of any anionic surfactants present, or the anionic surfactant has previously been neutralized by another means.

The structuring premix may further comprise a non-aminofunctional organic solvent. Non-aminofunctional organic solvents are organic solvents which contain no amino functional groups. Preferred non-aminofunctional organic solvents include monohydric alcohols, dihydric alcohols, polyhydric alcohols, glycerol, glycols including polyalkylene glycols such as polyethylene glycol, and mixtures thereof. More preferred non-aminofunctional organic solvents include monohydric alcohols, dihydric alcohols, polyhydric alcohols, glycerol, and mixtures thereof. Highly preferred are mixtures of non-aminofunctional organic solvents, especially mixtures of two or more of the following: lower aliphatic alcohols such as ethanol, propanol, butanol, isopropanol; diols such as 1,2-propanediol or 1,3-propanediol; and glycerol. Also preferred are mixtures of propanediol and diethylene glycol. Such mixtures preferably contain no methanol or ethanol.

Preferable non-aminofunctional organic solvents are liquid at ambient temperature and pressure (i.e. 21° C. and 1 atmosphere), and comprise carbon, hydrogen and oxygen. Non-aminofunctional organic solvents may be present when preparing the structuring premix, or added directly to the liquid composition.

The structuring premix may also comprise a preservative or biocide, especially when it is intended to store the premix before use.

The structuring premix can have a viscosity of from 10 to 10,000, preferably from 100 to 1000 Pa·s, as measured using an Anton Paar MCR 302 rheometer (Anton Paar, Graz, Austria), with a cone and plate geometry having an angle of 2°, and a gap of 206 microns, at a steady state shear rate of 0.01 s-1, at 25° C.

The structuring premix can further comprise at least one suspended particulate or droplet.

Liquid Compositions Comprising the Structuring Premix

The structuring premix of the present disclosure is useful for structuring liquid compositions, and especially liquid fabric care compositions. The liquid compositions of the present invention typically comprise from 0.01 wt % to 2 wt %, preferably from 0.03 wt % to 1 wt %, more preferably from 0.05 wt % to 0.5 wt % of the non-polymeric, crystalline, hydroxyl-containing structuring agent, introduced via the structuring premix.

Suitable liquid compositions include liquid fabric care compositions, such as laundry detergent compositions and rinse additives for laundry. As used herein, "liquid composition" refers to any composition comprising a liquid capable of wetting and treating a substrate. "Liquid fabric care composition" refers to compositions suitable for treating clothes, such as cleaning them, providing other fabric care benefits such as improved softness or freshness.

Liquid compositions are more readily dispersible, and can more uniformly coat the surface to be treated, without the need to first dissolve the composition, as is the case with solid compositions. Liquid compositions can flow at 25° C., and include compositions that have an almost water like viscosity, but also include "gel" compositions that flow slowly and hold their shape for several seconds or even minutes. The composition can include solids or gases in suitably subdivided form, but the overall composition excludes product forms which are non-fluid overall, such as tablets or granules. The liquid composition preferably has a density in the range from 0.9 to 1.3 grams per cubic centimeter, more specifically from 1.00 to 1.10 grams per cubic centimeter, excluding any solid additives but including any bubbles, if present.

Suitable rinse additives include liquid fabric softener compositions. As used herein, "liquid fabric softener composition" refers to any treatment composition comprising a liquid capable of softening fabrics e.g., clothing in a domestic washing machine. The composition can include solids or gases in suitably subdivided form, but the overall composition excludes product forms which are non-liquid overall, such as tablets or granules.

Aqueous liquid fabric softening compositions are preferred. For such aqueous liquid fabric softener compositions, the water content can be present at a level of from 5% to 98%, preferably from 50% to 96%, more preferably from 70% to 95% by weight of the liquid fabric softener composition.

The pH of the neat fabric softener composition is typically acidic to improve hydrolytic stability of the quaternary ammonium ester softening active and may be from pH 2.0 to 6.0, preferably from pH 2.0 to 4.5, more preferably from pH 2.0 to 3.5 (see Methods).

To provide a rich appearance while maintaining pourability of the fabrics softener composition, the viscosity of the fabric softener composition may be from 50 mPa·s to 800 mPa·s, preferably from 70 mPa·s to 600 mPa·s, more preferably from 100 mPa·s to 500 mPa·s as measured with a Brookfield® DV-E rotational viscometer (see Methods).

The liquid fabric softener composition of the present disclosure can comprise from 2% to 25%, preferably from 3% to 20%, more preferably from 3% to 17%, most preferably from 4% to 15% of a quaternary ammonium ester softening active (Fabric Softening Active, "FSA"). The level of quaternary ammonium ester softening active may depend of the desired concentration of total softening active in the composition (diluted or concentrated composition) and of the presence or not of other softening actives. However, the risk on increasing viscosities and phase instabilities over time is typically higher in fabric softener compositions with higher FSA levels. On the other hand, at very high FSA levels, the viscosity becomes more difficult to control.

Preferably, the iodine value (see Methods) of the parent fatty acid from which the quaternary ammonium fabric softening active is formed is from 5 to 60, more preferably from 10 to 45, even more preferably from 15 to 40. Without being bound by theory, lower melting points resulting in easier processability of the FSA are obtained when the parent fatty acid from which the quaternary ammonium fabric softening active is formed is at least partially unsaturated. Especially double unsaturated fatty acids enable easy to process FSA's.

Suitable quaternary ammonium ester softening actives include but are not limited to, materials selected from the group consisting of monoester quats, diester quats, triester quats and mixtures thereof. Preferably, the level of monoester quat is from 2.0% to 40.0%, the level of diester quat is from 40.0% to 98.0%, the level of triester quat is from 0.0% to 25.0% by weight of total quaternary ammonium ester softening active.

Suitable quaternary ammonium ester softening active may comprise compounds of the following formula:

$$\{R^2_{(4-m)}—N+—[X—Y—R^1]_m\}A-$$

wherein:

- m is 1, 2 or 3 with proviso that the value of each m is identical;
- each $R^1$ is independently hydrocarbyl, or branched hydrocarbyl group, preferably $R^1$ is linear, more preferably $R^1$ is partially unsaturated linear alkyl chain;
- each $R^2$ is independently a $C_1$-$C_3$ alkyl or hydroxyalkyl group, preferably $R^2$ is selected from methyl, ethyl, propyl, hydroxyethyl, 2-hydroxypropyl, 1-methyl-2-hydroxyethyl, poly($C_{2-3}$ alkoxy), polyethoxy, benzyl;
- each X is independently $—(CH_2)_n—$, $—CH_2—CH(CH_3)—$ or $—CH(CH_3)—CH_2—$ and
- each n is independently 1, 2, 3 or 4, preferably each n is 2;
- each Y is independently —O—(O)C— or C(O)—O—;
- A- is independently selected from the group consisting of chloride, methyl sulphate, and ethyl sulphate, preferably A- is selected from the group consisting of chloride and methyl sulphate, more preferably A- is methyl sulphate;

with the proviso that when Y is —O—(O)C—, the sum of carbons in each $R^1$ is from 13 to 21, preferably from 13 to 19. While the issue of increasing viscosity is bigger when the softener-compatible anion (A-) is methyl sulphate, it is the preferred softener-compatible anion because it facilitates the quaternization step in the manufacturing of the quaternary ammonium ester softening active.

Examples of suitable quaternary ammonium ester softening actives are commercially available from KAO Chemicals under the trade name Tetranyl AT-1 and Tetranyl AT-7590, from Evonik under the tradename Rewoquat WE16 DPG, Rewoquat WE18, Rewoquat WE20, Rewoquat WE28, and Rewoquat 38 DPG, from Stepan under the tradename Stepantex GA90, Stepantex VR90, Stepantex VK90, Stepantex VA90, Stepantex DC90, Stepantex VL90A.

These types of agents and general methods of making them are disclosed in U.S. Pat. No. 4,137,180.

The structuring premixes are of particular use in structuring liquid detergent compositions, and especially liquid laundry detergent compositions. The compositions can comprise any suitable level of anionic surfactant but are especially suited for compositions which comprise low levels, or more preferably no anionic surfactant. Since the structuring premixes of the present invention comprise only low levels of anionic surfactant, the structuring premix is particularly suitable for structuring liquid compositions which comprise cationic actives such as these selected from the group consisting of: quaternary ammonium ester softening actives, cationic antimicrobial agents, cationic polymeric deposition aids, cationically coated encapsulated perfumes, and mixtures thereof.

As used herein, "liquid detergent composition" refers to compositions suitable for cleaning substrates, such as clothes. Suitable liquid detergent compositions comprise sufficient detersive surfactant, so as to provide a noticeable cleaning benefit. Most preferred are liquid laundry detergent compositions, which are capable of cleaning a fabric, such as in a domestic washing machine.

The liquid detergent compositions of the present invention may comprise from 1% to 70%, preferably from 5% to 60%, more preferably from 10% to 50%, most preferably from 15% to 45% by weight of a detersive surfactant. Nonionic detersive surfactants are preferred.

The detergent compositions of the present invention preferably comprise up to 30%, more preferably from 1 to 15%, most preferably from 2 to 10% by weight of one or more nonionic surfactants. Suitable nonionic surfactants include, but are not limited to C12-C18 alkyl ethoxylates ("AE") including the so-called narrow peaked alkyl ethoxylates, C6-C12 alkyl phenol alkoxylates (especially ethoxylates and mixed ethoxy/propoxy), block alkylene oxide condensate of C6-C12 alkyl phenols, alkylene oxide condensates of C8-C22 alkanols and ethylene oxide/propylene oxide block polymers (Pluronic®-BASF Corp.), as well as semi polar nonionics (e.g., amine oxides and phosphine oxides). An extensive disclosure of suitable nonionic surfactants can be found in U.S. Pat. No. 3,929,678.

If anionic surfactant is present, the anionic surfactant is preferably present at a level of up to 30%, preferably from 2% to 25%, more preferably from 3% to 10% by weight of the liquid composition. If present, the anionic surfactant can be selected from the group consisting of: C11-C18 alkyl benzene sulphonates, C10-C20 branched-chain and random alkyl sulphates, C10-C18 alkyl ethoxy sulphates, mid-chain branched alkyl sulphates, mid-chain branched alkyl alkoxy sulphates, C10-C18 alkyl alkoxy carboxylates comprising 1-5 ethoxy units, modified alkylbenzene sulphonate, C12-C20 methyl ester sulphonate, C10-C18 alpha-olefin sulphonate, C6-C20 sulphosuccinates, and mixtures thereof. However, by nature, every anionic surfactant known in the art of detergent compositions may be used, such as those disclosed in "Surfactant Science Series", Vol. 7, edited by W. M. Linfield, Marcel Dekker. The detergent compositions preferably comprise at least one sulphonic acid surfactant, such as a linear alkyl benzene sulphonic acid, or the water-soluble salt form of the acid.

Preferably, the liquid detergent composition comprises from 1% to 95% by weight of water, non-aminofunctional organic solvent, and mixtures thereof. For concentrated liquid compositions, the composition preferably comprises from 15% to 70%, more preferably from 20% to 50%, most preferably from 25% to 45% by weight of water, non-aminofunctional organic solvent, and mixtures thereof. Alternatively, the liquid composition may be a low water liquid composition. Such low water liquid compositions can comprise less than 20%, preferably less than 15%, more preferably less than 10% by weight of water, and are particularly suited for making soluble unit-dose articles.

The liquid detergent composition of the present disclosure may comprise from 2% to 40%, more preferably from 5% to 25% by weight of a non-aminofunctional organic solvent.

The liquid detergent composition may also include conventional detergent ingredients selected from the group consisting of: additional surfactants selected from amphoteric, zwitterionic, cationic surfactant, and mixtures thereof; enzymes; enzyme stabilizers; amphiphilic alkoxylated grease cleaning polymers; clay soil cleaning polymers; soil release polymers; soil suspending polymers; bleaching systems; optical brighteners; hueing dyes; particulates; perfume and other odour control agents, including perfume delivery systems; hydrotropes; suds suppressors; fabric care perfumes; pH adjusting agents; dye transfer inhibiting agents; preservatives; non-fabric substantive dyes; and mixtures thereof.

The structuring premixes of the present disclosure are particularly effective at stabilizing particulates since the structuring premix, comprising longer threads, provides improved low shear viscosity. As such, the structuring premixes of the present invention are particularly suited for stabilizing liquid compositions which further comprise particulates. Suitable particulates can be selected from the group consisting of encapsulates, oils, pearlescent agents (such as mica and titanium dioxide), non-water-soluble polymers, and mixtures thereof. Suitable oils can be selected from the group consisting of: perfume oils, silicone antifoams, and mixtures thereof. Particularly preferred oils are perfumes, which provide an odour benefit to the liquid composition, or to substrates treated with the liquid composition. When added, such perfumes are added at a level of from 0.1% to 5%, more preferably from 0.3% to 3%, even more preferably from 0.6% to 2% by weight of the liquid composition.

Encapsulates can be added to liquid compositions, in order to provide a long lasting in-use benefit to the treated substrate. Encapsulates can be added at a level of from 0.01% to 10%, more preferably from 0.1% to 2%, even more preferably from 0.15% to 0.75% of the encapsulated active, by weight of the liquid composition. In a preferred embodiment, the encapsulates are perfume encapsulates, in which the encapsulated active is a perfume, and enzyme encapsulates in which the encapsulated active is one or more enzymes. Perfume encapsulates release the encapsulated perfume upon breakage, for instance, when the treated substrate is rubbed.

The encapsulates typically comprise an encapsulate core and an encapsulates wall that surrounds the encapsulates core. The encapsulates wall is typically formed by cross-linking formaldehyde with at least one other monomer. The core can comprise a benefit agent, such as a perfume.

The encapsulates core may optionally comprise a diluent. Diluents are material used to dilute the benefit agent that is to be encapsulated, and are hence preferably inert. That is, the diluent does not react with the benefit agent during making or use. Preferred diluents may be selected from the group consisting of: isopropylmyristate, propylene glycol, poly(ethylene glycol), or mixtures thereof.

Encapsulates, and methods of making them are disclosed in the following references: U.S. 2003-215417 A1; U.S. 2003-216488 A1; U.S. 2003-158344 A1; U.S. 2003-165692 A1; U.S. 2004-071742 A1; U.S. 2004-071746 A1; U.S. 2004-072719 A1; U.S. 2004-072720 A1; EP 1393706 A1; U.S. 2003-203829 A1; U.S. 2003-195133 A1; U.S. 2004-087477 A1; U.S. 2004-0106536 A1; U.S. Pat. Nos. 6,645,479; 6,200,949; 4,882,220; 4,917,920; 4,514,461; U.S. RE 32,713; U.S. Pat. No. 4,234,627.

Encapsulation techniques are disclosed in MICROENCAPSULATION: Methods and Industrial Applications, Edited by Benita and Simon (Marcel Dekker, Inc., 1996). Formaldehyde based resins such as melamine-formaldehyde or urea-formaldehyde resins are especially attractive for perfume encapsulation due to their wide availability and reasonable cost.

The encapsulates preferably have a size of from 1 micron to 75 microns, more preferably from 5 microns to 30 microns. The encapsulate walls preferably have a thickness of from 0.05 microns to 10 microns, more preferably from 0.05 microns to 1 micron. Typically, the encapsulate core comprises from 50% to 95% by weight of the benefit agent.

The liquid composition can include cationic antimicrobial agents, such as quaternary ammonium compounds. Such cationic antimicrobial agents provide antimicrobial efficacy to the liquid composition, such as a liquid fabric softening composition and/or liquid detergent composition.

Preferred quaternary ammonium compounds are those of the formula:

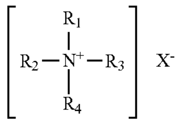

wherein at least one of $R_1$, $R_2$, $R_3$ and $R_4$ is a hydrophobic, aliphatic, aryl aliphatic or aliphatic aryl radical of from 6 to 26 carbon atoms, and the entire cation portion of the molecule has a molecular weight of at least 165. The hydrophobic radicals may be long-chain alkyl, long-chain alkoxy aryl, long-chain alkyl aryl, halogen-substituted long-chain alkyl aryl, long-chain alkyl phenoxy alkyl, aryl alkyl, etc. The remaining radicals on the nitrogen atoms other than the hydrophobic radicals are substituents of a hydrocarbon structure usually containing a total of no more than 12 carbon atoms. The radicals $R_1$, $R_2$, $R_3$ and $R_4$ may be straight chained or may be branched, but are preferably straight chained, and may include one or more amide or ester linkages. The radical X may be any salt-forming anionic radical, and preferably aids in the solubilization of the quaternary ammonium germicide in water. X can be a halide, for example a chloride, bromide or iodide, or X can be a methosulphate counterion, or X can be a carbonate ion.

More preferred quaternary ammonium compounds used in the compositions of the invention include those of the structural formula:

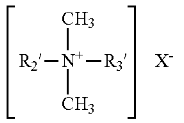

wherein $R_2'$ and $R_3'$ may be the same or different and are selected from C8-C12 alkyl, preferably $R_2'$ and $R_3'$ are C10, or $R_2'$ is alkyl, preferably C12-C18 alkyl, C8-C18 alkylethoxy, C8-C18 alkylphenolethoxy and $R_3'$ is benzyl or substituted benzyl, preferably ethyl benzyl. X is a halide, for example a chloride, bromide or iodide, or X is a methosulphate counterion. The alkyl groups recited in $R_2'$ and $R_3'$ may be linear or branched, but are preferably substantially linear, or fully linear.

Exemplary quaternary ammonium compounds include the alkyl ammonium halides such as cetyl trimethyl ammonium bromide, alkyl aryl ammonium halides such as octadecyl dimethyl benzyl ammonium bromide, N-alkyl pyridinium halides such as N-cetyl pyridinium bromide, and the like. Other suitable types of quaternary ammonium compounds include those in which the molecule contains either amide or ester linkages such as octyl phenoxy ethoxy ethyl dimethyl benzyl ammonium chloride, N-(laurylcocoaminoformylmethyl)-pyridinium chloride, and the like. Other very effective types of quaternary ammonium compounds which are useful as germicides include those in which the hydrophobic radical is characterized by a substituted aromatic nucleus as in the case of lauryloxyphenyltrimethyl ammonium chloride, cetylaminophenyltrimethyl ammonium methosulphate, dodecylphenyltrimethyl ammonium methosulphate, dodecylbenzyltrimethyl ammonium chloride, chlorinated dodecylbenzyltrimethyl ammon-ium chloride, and the like.

Particularly useful quaternary germicides include compositions presently commercially available under the tradenames BARDAC, BARQUAT, BTC, and HYAMINE. These quaternary ammonium compounds are usually provided in a solvent, such as a C2 to C6 alcohol (such as ethanol, n-propanol, isopropanol, n-butanol, sec-butanol, and the like), glycols such as ethylene glycol, or in an mixtures containing water, such alcohols, and such glycols. Particularly preferred is didecyl dimethyl ammonium chloride, such as supplied by Lonza under tradenames such as: Bardac 2250™, Bardac 2270™, Bardac 2270E™, Bardac 2280 ™, and/or a blend of alkyl, preferably C12-C18, dimethyl benzyl ammonium chloride and alkyl, preferably C12-C18, dimethyl ethylbenzyl ammonium chloride, such as supplied by Lonza under the brand names Barquat 4280Z™. In preferred embodiments, the alkyl dimethyl benzyl ammonium chloride and alkyl dimethyl ethylbenzyl ammonium chloride are present in a ratio of from 20:80 to 80:20, or 40:60 to 60:40, with a ratio of 50:50 being the most preferred.

Other suitable, but less preferred, antimicrobial agents include germicidal amines, particularly germicidal triamines such as LONZA-BAC 12, (ex. Lonza, Inc., Fairlawn, N.J. and/or from Stepan Co., Northfield IL, as well as other sources).

In the cleaning compositions according to the invention, the antimicrobial agent, preferably quaternary ammonium compound, is required to be present in amounts which are effective in exhibiting satisfactory germicidal activity— against selected bacteria sought to be treated by the cleaning compositions. Such efficacy may be achieved against less resistant bacterial strains with only minor amounts of the quaternary ammonium compounds being present, while more resistant strains of bacteria require greater amounts of the quaternary ammonium compounds in order to destroy these more resistant strains.

The quaternary ammonium compound need only be present in germicidally effective amounts, which can be as little as 0.001 wt %. In more preferred compositions, the hard surface cleaning composition comprises the antimicrobial agent at a level of from 0.05 wt % to 5.00 wt %, preferably from 0.1 wt % to 3.0 wt %, more preferably from 0.9% to 1.5 by weight of the composition, for improved shine in addition to germicidal efficacy.

A germicidally effective amount of the antimicrobial agent is considered to result in at least a log 4.5, preferably at least a log 5 reduction of *Staphylococcus aureus*, using the method of EN1276 (Chemical Disinfectants Bactericidal Activity Testing), in less than 3 minutes.

Unit Dose Articles

The liquid composition can also be encapsulated in a water soluble film, to form a unit dose article. Such unit dose articles comprise a liquid composition of the present invention, wherein the liquid composition is a low water liquid composition, and the liquid composition is enclosed in a water-soluble or dispersible film.

The unit dose article may comprise one compartment, formed by the water-soluble film which fully encloses at least one inner volume, the inner volume comprising the low water liquid composition. The unit dose article may optionally comprise additional compartments comprising further low water liquid compositions, or solid compositions. A multi-compartment unit dose form may be desirable for such reasons as: separating chemically incompatible ingredients; or where it is desirable for a portion of the ingredients to be released into the wash earlier or later. The unit-dose articles can be formed using any means known in the art.

Unit dose articles, wherein the low water liquid composition is a liquid laundry detergent composition are particularly preferred. The structuring premix of the present invention can be used to structure low water liquid compositions, comprising less than 45 wt %, preferably less than 30 wt %, more preferably less than 20%, most preferably less than 15 wt % of water.

Suitable water-soluble pouch materials include polymers, copolymers or derivatives thereof. Preferred polymers, copolymers or derivatives thereof are selected from the group consisting of: polyvinyl alcohols, polyvinyl pyrrolidone, polyalkylene oxides, acrylamide, acrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatin, natural gums such as xanthum and carragum. More preferred polymers are selected from polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates, and most preferably selected from polyvinyl alcohols, polyvinyl alcohol copolymers and hydroxypropyl methyl cellulose (HPMC), and combinations thereof.

Process for Making the Structuring Premix

The structuring premix of the present disclosure can be made using any suitable process. A preferred process comprises the steps of: combining in an aqueous surfactant blend, the at least two nonionic surfactants, such that at least one low HLB nonionic surfactant and at least one high HLB nonionic surfactant are present at a level to provide an average HLB of the at least two nonionic surfactants is from 9.5 to 12.5; making an emulsion comprising a non-polymeric, crystalline, hydroxyl-containing structuring agent in the aqueous surfactant blend, at a first temperature of from 80° C. to 98° C.; and cooling the emulsion.

In this step, the premix is then cooled. Without wishing to be bound by theory, it is believed that during cooling, the liquid oil emulsion droplets de-wet as a result of surfactant adsorption, thereby promoting crystallization. Small crystals may nucleate from around the emulsion droplets during cooling. It is further believed that crystallization may be influenced by surfactant adsorption or cooling rate. The external structuring system is cooled at a cooling rate of from about 0.1° C./min to about 10° C./min, from about 0.5° C./min to about 1.5° C./min, or from about 0.8° C./min to about_1.2° C./min.

The emulsion comprises droplets of non-polymeric, crystalline, hydroxyl-containing structuring agent, preferably hydrogenated castor oil (HCO), in molten form. The droplets preferably have a mean diameter of from 0.1 microns to 4 microns, more preferably from 1 micron to 3.5 microns, even more preferably from 2 microns to 3.5 microns, most preferably from 2.5 microns to 3 microns. The mean diameter is measured at the temperature at which emulsification is completed.

The emulsion can be prepared by providing a first liquid comprising, or even consisting of, the non-polymeric, crystalline, hydroxyl-containing structuring agent in molten form and a second liquid comprising or consisting of the aqueous surfactant blend. The first liquid is emulsified into the second liquid. This is typically done by combining the first liquid and second liquid together and passing them through a mixing device. Any suitable device, delivering energy input to the premix can be applied to form the emulsion. Non-limiting examples of such devices may be selected from: static mixers and dynamic mixers (including all kinds of low shear and high shear mixers. In some embodiments, the emulsion can be formed in batch making system or in a semi continuous making system or a continuous making system.

The second liquid can comprise from 50% to 99%, more preferably from 60% to 95%, most preferably from 70% to 90% by weight of water. The second liquid comprises the alkyl sulphate surfactant, in order to improve emulsification. In a preferred embodiment, the second liquid comprises at least 1% by weight, preferably 1% to 50%, more preferably 5% to 40%, most preferably 10 to 30% by weight of the surfactant. It should be understood that the surfactant is present in the second liquid at a concentration such that the emulsion produced is droplets of non-polymeric, crystalline, hydroxyl-containing structuring agent, present in a primarily water continuous phase, not a primarily surfactant continuous phase.

The second liquid can comprise a preservative. Preferably the preservative is an antimicrobial. Any suitable preservative can be used, such as one selected from the 'Acticide' series of antimicrobials, commercially available from Thor Chemicals, Cheshire, UK.

The first liquid and the second liquid are combined to form an emulsion at the first temperature. The first temperature is from 80° C. to 98° C., preferably from 85° C. to 95° C., more preferably from 87.5° C. to 92.5° C., to form the emulsion.

Preferably, the first liquid is at a temperature of 70° C. of higher, more preferably between 70° C. and 150° C. most preferably between 75° C. and 120° C., immediately before combining with the second liquid. This temperature range ensures that the non-polymeric, crystalline, hydroxyl-containing structuring agent is molten so that the emulsion is efficiently formed. However, a temperature that is too high results in discoloration or even degradation of the non-polymeric, crystalline, hydroxyl-containing structuring agent.

The second liquid is typically at a temperature of from 80° C. to 98° C., preferably from 85° C. to 95° C., more preferably from 87.5° C. to 92.5° C., before being combined with the first liquid. That is, at or close to, the first temperature.

The ratio of non-polymeric, crystalline, hydroxyl-containing structuring agent to water in the emulsion can be from 1:50 to 1:5, preferably 1:33 to 1:7.5, more preferably 1:20 to 1:10. In other words the ratio of non-polymeric, crystalline, hydroxyl-containing structuring agent to water, as the two liquid streams are combined, for instance, upon entering a mixing device, can be from 1:50 to 1:5, preferably 1:33 to 1:7.5, more preferably 1:20 to 1:10.

The process to make the emulsion can be a continuous process or a batch process. By being continuous, down-time between runs is reduced, resulting in a more cost and time efficient process. By 'continuous process' we herein mean continuous flow of the material through the apparatus. By 'batch processes' we herein mean where the process goes through discrete and different steps. The flow of product through the apparatus is interrupted as different stages of the transformation are completed, i.e. discontinuous flow of material.

Without being bound by theory, it is believed that the use of a continuous process provides improved control of the emulsion droplet size, as compared to a batch process. As a result, a continuous process typically results in more efficient production of droplets having the desired mean size, and hence a narrower range of droplet sizes. Batch production of the emulsion generally results in larger variation of the droplet size produced, due to the inherent variation in the degree of mixing occurring within the batch tank. Variability can arise due to the use and placement of the mixing paddle within the batch tank. The result is zones of slower moving liquid (and hence less mixing and larger droplets), and zones of faster moving liquid (and hence more mixing and smaller droplets). Those skilled in the art will know how to select appropriate mixing devices to enable a continuous process. Furthermore, a continuous process will allow for faster transfer of the emulsion to the cooling step. The continuous process will also allow for less premature cooling, that can occur in a batch tank before transfer to the cooling step.

The emulsion can be prepared using any suitable mixing device. The mixing device typically uses mechanical energy to mix the liquids. Suitable mixing devices can include static and dynamic mixer devices. Examples of dynamic mixer devices are homogenizers, rotor-stators, and high shear mixers. The mixing device could be a plurality of mixing devices arranged in series or parallel in order to provide the necessary energy dissipation rate.

Preferably, the emulsion is formed by combining the ingredients via high energy dispersion, having an energy dissipation rate of from $1\times10^2$ W/Kg to $1\times10^7$ W/Kg, preferably from $1\times10^3$ W/Kg to $5\times10^6$ W/Kg, more preferably from $5\times10^4$ W/Kg to $1\times10^6$ W/Kg.

Without being bound by theory, it is believed that high energy dispersion reduces the emulsion size and increases the efficiency of the crystal growth in later steps.

The emulsion can be cooled to the second temperature by any suitable means, such as by passing it through a heat exchanger device. Suitable heat exchanger devices can be selected from the group consisting of: plate and frame heat exchanger, shell and tube heat exchangers, and combinations thereof.

The emulsion can be passed through more than one heat exchanger device. In this case the second and subsequent heat exchanger devices are typically arranged in series with respect to the first heat exchanger. Such an arrangement of heat exchanger devices can be used to control the cooling profile of the emulsion.

The emulsion is maintained at the second temperature for at least 2 minutes. Preferably, the emulsion is maintained at the second temperature for a period of from 2 to 30 minutes, preferably from 5 to 20 minutes, more preferably from 10 to 15 minutes.

Any suitable means can be used for incorporating the structuring premix into a liquid composition, including static mixers, and through the use of over-head mixers, such as typically used in batch processes.

Preferably, the structuring premix is added after the incorporation of ingredients that require high shear mixing, in order to minimise damage to the threads of the structuring premix. More preferably, the structuring premix is the last ingredient incorporated into the liquid composition. The structuring premix is preferably incorporated into the liquid composition using low shear mixing. Preferably, the structuring premix is incorporated into the liquid composition using average shear rates of less than $1000s^{-1}$, preferably less than $500s^{-1}$, more preferably less than $200s^{-1}$. The residence time of mixing is preferably less than 20s, more preferably less than 5s, more preferably less than 1s. The shear rate and residence time is calculated according to the methods used for the mixing device, and is usually provided by the manufacturer. For instance, for a static mixer, the average shear rate is calculated using the equation:

$$\dot{\gamma} = \frac{v_{pipe}}{D_{pipe}} * v_f^{-3/2}$$

where:

$v_f$ is the void fraction of the static mixer (provided by the supplier)

$D_{pipe}$ is the internal diameter of the pipe comprising the static mixer elements $v_{pipe}$ is the average velocity of the fluid through a pipe having internal diameter $D_{pipe}$, calculated from the equation:

$$v_{pipe} = \frac{4Q}{\pi D_{pipe}^2}$$

Q is the volume flow rate of the fluid through the static mixer.

For a static mixer, the residence time is calculated using the equation:

$$\text{residence time} = \frac{\pi D_{pipe}^2 v_f L}{4Q}$$

where:

L is the length of the static mixer.

Methods

A) pH Measurement:

The pH is measured on the neat composition, at 25° C., using a Santarius PT-10P pH meter with gel-filled probe (such as the Toledo probe, part number 52 000 100), calibrated according to the instructions manual.

B) Rheology:

Viscosity measurements are conducted using a AR-G2 rheometer (TA instruments) using a cone and plate geometry (equipped with a 2° stainless steel cone, of 60 mm diameter and 50 μm gap). Steady-state flow experiments are performed starting at a shear rate of 0.01 $s^{-1}$ and increasing the shear rate to $100^{-1}$ $s^{-1}$, with 10 points per decade, logarithmically spaced. Data is acquired for a sample time of 30 s and at least three consecutive measurements are made at each point.

Yield point measurements are conducted on an AR-G2 rheometer (TA instruments) using a cone and plate geometry (equipped with a 2° stainless steel cone, of 60 mm diameter and 50 μm gap). Steady-state flow experiments are performed starting at a shear rate of 10 $s^{-1}$ and reducing the shear rate to $10^{-1}$ $s^{-1}$, with 10 points per decade, logarithmically spaced. Data is acquired for a sample time of 30 s and at least three consecutive measurements made at each point. The shear rate-shear stress (flow) curves are fitted, between 0.1 and 10 $s^{-1}$, to the Herschel-Bulkley equation (below) where $\sigma_0$ is the yield stress, $\sigma$ is the shear stress, $\dot{\gamma}$, is the shear rate, K is a measure of viscosity and n is the power law exponent $$\sigma=\sigma_0+K\dot{\gamma}^n$$

C) Energy Dissipation Rate:

In a continuous process comprising a static emulsification device, the energy dissipation rate is calculated by measuring the pressure drop over the emulsification device, and multiplying this value by the flow rate, and then dividing by the active volume of the device. In the case where an emulsification is conducted via an external power source, such as a batch tank or high shear mixer, the energy dissipation is calculated via the following Formula 1 (Kowalski, A. J., 2009., Power consumption of in-line rotor-stator devices. Chem. Eng. Proc. 48, 581.);

$$P_f=P_T+P_F+P_L \quad \text{Formula 1}$$

Wherein $P_T$ is the power required to rotate the rotor against the liquid, $P_F$ is the additional power requirements from the flow of liquid and $P_L$ is the power lost, for example from bearings, vibration, noise etc.

EXAMPLES

Inventive and comparative premixes were made using the following procedure:

The premixes were made in a starch pasting cell (TA instruments), mounted to a Discovery Hybrid Rheometer (DHR), supplied by TA Instruments: New Castle, Delaware, and running the Trios® software (version No. 5.0.0.44608).

A total of 30.0 g of demineralized water, surfactants and flaked hydrogenated castor oil were added to the starch pasting cell cup in the appropriate amounts to provide the blends shown in Table 1. If used, the anionic surfactant (linear alkyl benzene sulphonate) was first neutralized using monoethanolamine The cell cup was then placed into the cell jacket, mounted to the rheometer. The impeller was then lowered into the cup to the correct height and the locking cover attached. The rheometer temperature was set to 90° C. and the cell contents stirred with the mixing rate setpoint of 20 on the Trios® software used to run the rheometer, for a period of until 10 minutes after the set temperature was reached.

Inventive premixes 1 to 6 comprised both a high HLB nonionic surfactant and a low HLB nonionic surfactant, at levels resulting in an average HLB falling within the range required for the present invention. In contrast, comparative example A comprised a single nonionic surfactant and comparative examples B and C comprised high HLB nonionic surfactant and low HLB nonionic surfactant at levels which resulted in the average HLB being outside the range required by the present invention.

The premixes were dispersed into a model detergent composition in a 10:90 weight ratio. The model detergent composition consisted of 10.0% by weight of linear alkylbenzene sulfonate (HLAS) and 1.9% by weight of monoethanolamine in demineralised water. As such, the resultant detergent mixture comprised 9% of anionic surfactant (HLAS) and 0.4% hydrogenated castor oil. The yield point was then measured.

As can be seen by the resultant yield points in Table 1, the premixes of the present invention provide improved structuring while comprising limited or no anionic surfactant in comparison to the comparative premixes.

TABLE 1 inventive structuring premixes and comparative structuring premixes:

| | HLB | Ex 1 wt % | Ex 2 wt % | Ex 3 wt % | Ex 4 wt % | Ex 5 wt % | Ex 6 wt % | Ex A wt % | Ex B wt % | Ex C wt % |
|---|---|---|---|---|---|---|---|---|---|---|
| Low HLB surfactant: | | | | | | | | | | |
| C11 EO3[1] | 8.7 | 6.5 | — | — | 6.0 | — | — | — | — | — |
| C12-14 EO3[2] | 8.0 | — | 4.0 | — | — | 1.0 | 2.4 | — | 9.6 | 2.04 |
| C12-15 EO3[3] | 7.5 | — | — | 2.0 | — | — | — | — | — | — |
| High HLB surfactant: | | | | | | | | | | |
| C12-15 EO12[4] | 14.4 | 5.5 | — | — | — | — | — | — | 2.4 | |
| C12-14 EO9[5] | 13.0 | — | 8.0 | — | — | — | 9.6 | 12.0 | — | — |
| C12-16 EO7[6] | 12.0 | — | — | 10 | — | 10.8 | — | — | — | — |
| C9-11 EO8[7] | 14.0 | — | — | — | 6.0 | — | — | — | — | 9.96 |
| Anionic surfactant | | | | | | | | | | |
| C10-14 LAS[8] | | 0.4 | 0.4 | 0.4 | 0.4 | 0.4 | — | — | 0.4 | — |

TABLE 1-continued inventive structuring premixes and comparative structuring premixes:

| | HLB | Ex 1 wt % | Ex 2 wt % | Ex 3 wt % | Ex 4 wt % | Ex 5 wt % | Ex 6 wt % | Ex A wt % | Ex B wt % | Ex C wt % |
|---|---|---|---|---|---|---|---|---|---|---|
| Alkaline agent | | | | | | | | | | |
| Monoethanolamine | | 0.08 | 0.08 | 0.08 | 0.08 | 0.08 | — | — | 0.08 | — |
| Hydrogenated castor oil[9] | | 4.0 | 4.0 | 4.0 | 4.0 | 4.0 | 4.0 | 4.0 | 4.0 | 4.0 |
| HLB of nonionic surfactant (average) | | 11.3 | 11.3 | 11.3 | 11.4 | 11.7 | 12.0 | 13.0 | 9.3 | 13.0 |
| Yield point in model liquid detergent composition (mPa · s)[10] | | 70 | 80 | 70 | 100 | 50 | 70 | 20 | 1.0 | 9 |

[1]Tomadol 1-3, supplied by Evonik Industries
[2]Surfonic 24-3, supplied by Huntsman
[3]Tomadol 25-3, supplied by Evonik Industries
[4]Tomadol 25-12, supplied by Evonik Industries
[5]Surfonic 24-9, supplied by Huntsman
[6]Lorodac 26-7, supplied by Sasol
[7]Tomadol 91-8, supplied by Evonik Industries
[8]Linear alkyl benzene sulphonate supplied by Procter and Gamble, neutralized using monoethanolamine
[9]Thixcin R ®, supplied by Elementis Global
[10]estimated, based on Herschel-Bulkley model, using the Trios ® software version number 5.0.0.44608

The following structuring premixes were made using the same methodology as above and the yield point measured, but using a commercial detergent composition comprising less than 5.0% by weight of anionic surfactant (Dreft Stage 1: Newborn Liquid Detergent, sold in North America)

| | HLB | Ex 7 wt % | Ex 8 wt % | Ex D wt % | Ex E wt % |
|---|---|---|---|---|---|
| Low HLB surfactant: | | | | | |
| C12-14 EO3[2] | 8.0 | 4.5 | 4.5 | — | — |
| High HLB surfactant: | | | | | |
| C14-15 EO7[11] | 10.5 | — | — | 12 | 30 |
| C12-16 EO7[6] | 12.0 | 7.5 | 7.5 | — | — |
| Anionic surfactant | | | | | |
| C10-14 LAS[8] | | 1.7 | 0.4 | 1.7 | 1.7 |

-continued

| | HLB | Ex 7 wt % | Ex 8 wt % | Ex D wt % | Ex E wt % |
|---|---|---|---|---|---|
| Alkaline agent | | | | | |
| Monoethanolamine | | 0.32 | 0.08 | 0.32 | 0.32 |
| Hydrogenated castor oil[9] | | 6.0 | 6.0 | 6.0 | 6.0 |
| HLB of nonionic surfactant (average) | | 10.5 | 10.5 | 10.5 | 10.5 |
| Yield point (mPa · s) in Dreft liquid detergent composition[10] | | 238 | 128 | 116 | 21 |

[11]Tomadol 45-7

The following are liquid detergent compositions that can be made using structuring premixes of the present invention:

TABLE 2

Liquid detergent compositions comprising a premix of the present invention:

| | Ex 7 wt % | Ex 8 wt % | Ex 9 wt % | Ex 10 wt % |
|---|---|---|---|---|
| Linear Alkylbenzene sulphonic acid[8] | 3.5 | — | 2.5 | 4 |
| C12-14 alkyl ethoxy 3 sulphate Na salt | — | — | — | 2.75 |
| C12-14 alkyl ethoxy 3 sulphate MEA salt | — | — | — | — |
| C12-14 sodium lauryl sulfate | 3 | 6.5 | — | — |
| C12-14 alkyl 7-ethoxylate | 7 | 5.5 | 4.5 | 2.5 |
| C14-15 alkyl 7-ethoxylate | 4 | — | 6.5 | — |
| C12-18 Fatty acid | — | 2.3 | — | 2.5 |
| C12-14 Amine Oxide | 0.3 | 1.3 | — | 0.4 |
| Sodium Cumene sulphonate | 1.4 | | 0.7 | 1.3 |
| Diethylenetriamine (DETA) | 0.05 | — | — | — |
| Monoethanolamine | 3.2 | — | 1.0 | — |
| Citric acid | 1.3 | 1.3 | 14 | 2.9 |
| Ethoxysulphated hexamethylene diamine dimethyl quat | — | — | — | 0.5 |
| Ethanol | 3 | 0.6 | — | 0.4 |
| Sodium Tetraborate | 1.4 | 1 | — | — |
| Soil Suspending Alkoxylated Polyalkylenimine Polymer | 0.5 | 2 | 0.5 | — |
| PEG-PVAc Polymer[12] | — | — | — | 0.6 |
| Diethylenetriamine penta(methylene phosphonic acid) sodium salt (DTPMP) | 0.5 | — | 0.3 | — |

TABLE 2-continued

| Liquid detergent compositions comprising a premix of the present invention: | Ex 7 wt % | Ex 8 wt % | Ex 9 wt % | Ex 10 wt % |
|---|---|---|---|---|
| N,N-Dicarboxymethylglutamic acid (GLDA) | — | 0.3 | — | — |
| Diethylene triamine pentaacetic acid (DTPA) | — | — | — | 0.1 |
| Fluorescent Whitening Agent | 0.1 | — | — | 0.1 |
| 1,2 Propanediol | 1.7 | 2.3 | 4 | — |
| Sodium Formate | — | 0.75 | — | — |
| Premix selected from ex 1 to ex 6 | 4 | 2.5 | 3 | 10 |
| Perfume | 0.45 | 0.65 | 0.9 | — |
| Sodium Hydroxide | 1.3 | 0.9 | 0.25 | 2.1 |
| Protease enzyme | 0.7 | — | — | 0.33 |
| Amylase enzyme | 0.2 | 0.2 | — | 0.15 |
| Mannanase enzyme | — | — | — | 0.06 |
| Xyloglucanase enzyme | — | 0.1 | — | — |
| Pectate lyase enzyme | — | — | — | 0.1 |
| RNase or DNase enzyme [13] | 0.01 | — | — | 0.01 |
| Fluorescent brightener[14] | 0.2 | 0.1 | 0.1 | 0.1 |
| 4,4 dichloro2-hydroxy diphenyl ether[15] | — | — | 0.1 | — |
| Antioxidant[16] | 0.1 | 0.1 | 0.1 | 0.1 |
| Perfume microcapsules | 0.45 | — | — | — |
| Water and minors (antifoam, aesthetics, . . .) | to 100 | to 100 | to 100 | to 100 |

[12]Polyvinyl acetate grafted polyethylene oxide copolymer having a polyethylene oxide backbone and multiple polyvinyl acetate side chains, supplied by BASF, Germany

[13] Such as wild-types and variants of DNases defined by SEQ ID NOS: 1, 2, 3, 4, 5, 6, 7, 8 and 9 in WO2017162836 (Novozymes), and variants of the *Bacillus cibi* DNase including those described in WO2018011277 (Novozymes), and/or RNases such as wild-types and variants of DNases defined by SEQ ID NOS: 3, 6, 9, 12, 15, 57, 58, 59, 60, 61, 62, 63, 64, 65, 66, 67, 72 and 73 in WO2018178061 (Novozymes); DNase may comprise minor amounts of super oxide dismutase impurity

[14]such as 4,4'-bis{[4-anilino-6-morpholino-s-triazine-2-yl]amino}-2,2'-stilbenedisulfonate disodium salt, 2,2'-([1,1'-Biphenyl]-4,4'-diyldi-2,1-ethenediyl)bis-benzenesulfonic acid disodium salt, or 5-[(4-amino-6-anilino-1,3,5-triazin-2-yl)amino]-2-[(Z)-2-[4-[(4-amino-6-anilino-1,3,5-triazin-2-yl)amino]-2-sulfonatophenyl]ethenyl]benzenesulfonate

[15]Tinosan ® HP, supplied by BASF, Germany

[16]Suitable antioxidants include: 3,5-di-tert-butyl-4-hydroxytoluene; benzenamine, 4-(1-methyl-1-phenyl ethyl)-N-[4-(1-methyl-1-phenyl ethyl)phenyl-; octadecyl di-ter-butyl-4-hydroxy-hydrocinnamate amd mixtures thereof The following are liquid fabric softening compositions that can be made using structuring premixes of the present invention:

TABLE 3

| Liquid fabric softening compositions comprising a premix of the present invention: | Ex. 11 wt % | Ex. 12 wt % | Ex. 13 wt % | Ex. 14 wt % | Ex. 15 wt % |
|---|---|---|---|---|---|
| N,N-bis(hydroxyethyl)-N,N-dimethyl ammonium chloride fatty acid ester[17] | 4.04 | 4.96 | 4.95 | 8.95 | 8.96 |
| 1-Hydroxyethane 1,1-diphosphonic acid, Na salt (HEDP)[18] | 0.007 | 0.007 | 0.007 | 0.007 | 0.007 |
| Formic acid | 0.043 | 0.042 | 0.042 | 0.042 | 0.042 |
| HCl | 0.033 | 0.033 | 0.033 | 0.033 | 0.033 |
| dipropylene glycol solution of 1,2-benzisothiazolin-3-one[19] | 0.021 | 0.021 | 0.021 | 0.021 | 0.021 |
| Coconut oil | 0.3 | 0.3 | 0.3 | 0.2 | 0.2 |
| Isopropanol | 0.76 | 0.76 | 0.75 | 0.75 | 0.75 |
| $CaCl_2$ | 0.05 | 0.05 | 0.05 | 0.05 | 0.05 |
| Encapsulated perfume | 0.25 | 0.25 | 0.25 | 0.25 | 0.25 |
| Perfume | 3.00 | 3.00 | 3.00 | 3.00 | 3.00 |
| Water and minors (antifoam, dye, aesthetics, . . .) | to 100 | to 100 | to 100 | to 100 | to 100 |

[17]supplied by Evonik, iodine value of the parent fatty acid of this material is between 18 and 22, the material contains impurities in the form of free fatty acid, and the monoester and diester forms of the N,N-bis(hydroxyethyl)-N,N-dimethyl ammonium chloride fatty acid ester

[18]alternatively diethylenetriaminepentaacetic acid, Na salt (DTPA)

[19]supplied as a 20% aqueous solution under the trade name Proxel ® GXL by Lonza The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A structuring premix comprising:

a) about 1.0% to about 16% by weight of a non-polymeric, crystalline, hydroxyl-containing structuring agent comprising crystallizable glyceride;

b) about 4.0% to about 20% of at least two nonionic surfactants, wherein the at least two nonionic surfactants comprise:

(i) at least one low HLB nonionic surfactant, wherein the at least one low HLB nonionic surfactant has an HLB of about 5.0 to about 9.5, and wherein the structuring premix comprises about 0.5% to about 8.0% by weight of the low HLB nonionic surfactant;

(ii) at least one high HLB nonionic surfactant, wherein the at least one high HLB nonionic surfactant has an HLB of about 10.5 to about 16.0, and wherein the structuring premix comprises about 1.5% to about 16% by weight of the high HLB nonionic surfactant;

wherein the average HLB of the at least two nonionic surfactants is about 11 to about 12.5, and the nonionic surfactants for both the low HLB nonionic surfactant and high HLB nonionic surfactant are selected from alkoxylated alcohol nonionic surfactants, alkyl polyglucoside nonionic surfactants, and mixtures thereof, wherein the average HLB is the weight average of the HLBs of the individual surfactants; and c) from 45% to 97% by weight of the premix of water, wherein the premix comprises no additional surfactant beyond the nonionic surfactant and anionic surfactant, and the premix comprises less than 5% by weight of the anionic surfactant.

2. The structuring premix according to claim 1, wherein the structuring premix comprises about 1.0% to about 10% by weight of the non-polymeric, crystalline, hydroxyl-containing structuring agent.

3. The structuring premix according to claim 2, wherein the structuring premix comprises about 2.0% to about 6.0% by weight of the non-polymeric, crystalline, hydroxyl-containing structuring agent.

4. The structuring premix according to claim 1, wherein:

a) the at least one low HLB nonionic surfactant has an HLB of about 7.5 to about 9.0;

b) the at least one high HLB nonionic surfactant has an HLB of about 12.0 to about 14.5; and wherein the average HLB of the at least two nonionic surfactants is about 11.0 to about 12.0.

5. The structuring premix according to claim 1, wherein the structuring premix comprises about 10% to about 16% by weight of nonionic surfactant.

6. The structuring premix according to claim 1, wherein the structuring premix comprises:

a) about 2.0% to about 6.0% by weight of the low HLB nonionic surfactant; and b) about 6.0% to about 8.0% by weight of the high HLB nonionic surfactant.

7. The structuring premix according to claim 1, wherein the premix comprises 0.25% to 1.0% by weight of anionic surfactant.

8. The structuring premix according to claim 1, wherein, if present, the anionic surfactant is selected from the group consisting of alkyl sulphate surfactant, alkyl alkoxy sulphate surfactant, linear alkyl benzene sulphonate surfactant, and mixtures thereof.

9. The structuring premix according to claim 8, wherein, if present, the anionic surfactant is linear alkyl benzene sulphonate surfactant.

10. The structuring premix according to claim 1, wherein the crystallisable glyceride comprises hydrogenated castor oil.

11. The structuring premix according to claim 1, wherein the structuring premix has a viscosity of about 10 to about 10,000 Pa·s, at a steady state shear rate of about 0.01 $s^{-1}$, at about 25° C.

12. The structuring premix according to claim 1, wherein the structuring premix further comprises at least one suspended particulate or droplet.

13. A process for making a structured liquid fabric care composition, comprising the steps of:

a) providing a structuring premix according to claim 1;

b) combining the structuring premix with a liquid fabric care composition.

14. A liquid fabric care composition comprising a structuring premix according to claim 1, wherein the liquid fabric care composition comprises less than about 7.5% of anionic surfactant.

15. The liquid fabric care composition according to claim 14, wherein the fabric care composition comprises particulates, wherein the particulates are selected from the group consisting of encapsulates, oils, pearlescent agents, non-water-soluble polymers, and mixtures thereof.

16. The liquid fabric care composition according to claim 14, wherein the fabric care composition comprises a cationic ingredient, wherein the cationic ingredient is selected from the group consisting of: quaternary ammonium ester softening actives, cationic antimicrobial agents, cationic polymeric deposition aids, cationically coated encapsulated perfumes, and mixtures thereof.

17. The structuring premix according to claim 1, wherein the structuring premix exhibits a yield point of greater than 20, according to the Rheology method.

* * * * *